United States Patent [19]
McEvoy et al.

[11] 3,876,787
[45] Apr. 8, 1975

[54] METHOD FOR LOWERING BLOOD PRESSURE IN MAMMALS

[75] Inventors: Francis Joseph McEvoy, Pearl River, N.Y.; George Rodger Allen, Jr., Old Tappan, N.J.

[73] Assignee: American Cyanamid Company, Stamford, Conn.

[22] Filed: Aug. 27, 1973

[21] Appl. No.: 391,700

Related U.S. Application Data

[63] Continuation of Ser. No. 259,189, June 2, 1972, abandoned.

[52] U.S. Cl. .............................................. 424/250
[51] Int. Cl. .......................................... A61k 27/00

[58] Field of Search ..................................... 424/250

[56] References Cited
UNITED STATES PATENTS
3,475,431   10/1969   Bachmann ......................... 260/250

*Primary Examiner*—Jerome D. Goldberg
*Attorney, Agent, or Firm*—Edward A. Conroy, Jr.

[57] ABSTRACT

This disclosure describes a method of lowering blood pressure in mammals by the administration of compositions containing as the active component certain 6-(substituted-phenyl)-4,5-dihydro-3(2H)-pyridazinones.

4 Claims, No Drawings

METHOD FOR LOWERING BLOOD PRESSURE IN MAMMALS

This is a continuation, of application Ser. No. 259,189, filed June 2, 1972, now abandoned.

BRIEF SUMMARY OF THE INVENTION

This invention relates to new compositions of matter for lowering blood pressure. More particularly, it relates to therapeutic compositions containing certain 6-(-substituted-phenyl)-4,5-dihydro-3(2h)pyridazinones which operate to reduce blood pressure in mammals. The invention includes the new compositions of matter and methods of lowering blood pressure therewith.

The invention is based upon the discovery that certain 6-(substituted-phenyl)-4,5-dihydro-3(2H)-pyridazinones are potent hypotensive agents. The 6-(substituted-phenyl)-4,5-dihydro-3(2H)-pyridazinones of the present invention may be represented by the following general formula:

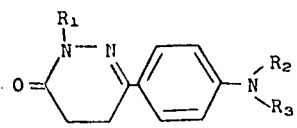

wherein $R_1$ is hydrogen or methyl; $R_2$ is methyl, ethyl or n-propyl; and $R_3$ is hydrogen or lower alkanoyl. Suitable lower alkanoyl groups contemplated by the present invention are those having up to four carbon atoms such as formyl, acetyl, propionyl, n-butyryl and isobutyryl.

DETAILED DESCRIPTION OF THE INVENTION

The active compounds of the present invention are generally obtainable as white crystalline materials having characteristic melting points and absorption spectra and which may be purified by recrystallization from common solvents such as water, ethanol, acetone and mixtures thereof. They are soluble in many organic solvents such as ethyl acetate, chloroform, dimethylformamide, and the like but are relatively insoluble in nonpolar solvents such as hexane and diethyl ether.

The active compounds of the present invention may be readily prepared from methyl 3-(p-2,2,2-trifluoroacetamidobenzoyl)propionate (I) as set forth in the following reaction scheme:

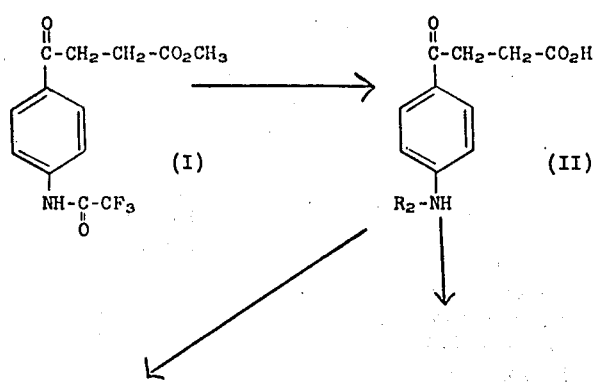

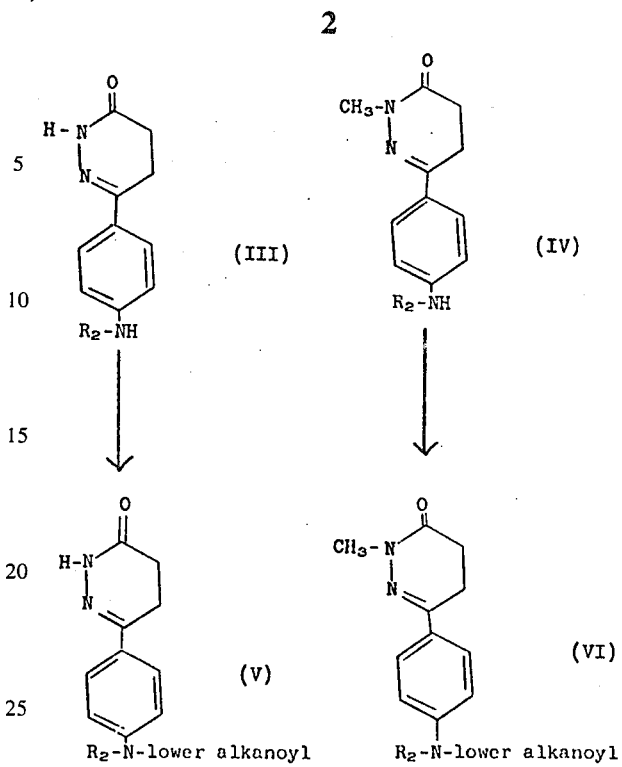

wherein $R_2$ is methyl, ethyl, or n-propyl. In accordance with the above reaction scheme, the trifluoroacetanilide (I) may be converted into the β-(p-lower alkylaminobenzoyl)propionic acids (II) by conversion to the anion with a base such as powdered potassium hydroxide and alkylation with methyl iodide, ethyl iodide, or n-propyl iodide. If the alkylating agent is methyl iodide, the reaction is substantially complete within 5 minutes at steam bath temperature. However, the reaction with ethyl iodide or n-propyl iodide requires a time of at least 60 minutes when conducted at steam bath temperature. Condensation of a β-(p-lower alkylaminobenzoyl)propionic acid (II) with hydrazine provides the corresponding 6-(p-lower alkylaminophenyl)-4,5-dihydro-3(2H)-pyridazinone (III) whereas condensation of (II) with methylhydrazine provides the corresponding 6-(p-lower alkylaminophenyl)-2-methyl-4,5-dihydro-3-(2H)-pyridazinone (IV). This condensation, with either hydrazine or methylhydrazine, is best carried out in ethanol as solvent at the reflux temperature for a few hours. Treatment of he 4,5-dihydro-3(2H)-pyridazinones of formulae (III) and (IV) with a lower alkanoyl halide or anhydride (such as formyl acetyl anhydride, acetic anhydride, propionic anhydride, n-butyryl bromide, or isobutyryl chloride) at 25°–100°C. provides the products of formulae (V) and (VI).

Typical compounds which may be thus prepared are, for example, 6-(p-ethylaminophenyl)-4,5-dihydro-3(2H)-pyridazinone, 6-(N-methyl-p-propionamidophenyl)-4,5-dihydro-3(2H)-pyridazione, 6-(N-n-propyl-p-isobutyramidophenyl)-4,5-dihydro-3(2H)pyridazinone, 6-(N-ethyl-p-formanidephenyl)-4,5-dihydro-3-(2H)-pyridazinone, 6-(N-ethyl-p-n-butyramidophenyl) 4,5-dihydro-3(2H)-pyridazinone, 6-(N-ethyl-p-formamidophenyl) -2-methyl-4,5-dihydro-3(2H)-pyridazinone, 6-(N-methyl-p-n-butyramidophenyl)-2-methyl-4,5-dihydro-3(2H)- pyridazinone, 6-(N-n-propyl-p-acetamidophenyl)-2-methyl-4,5-dihydro-3(2H)-pyridazinone, and 6-(N-ethyl-p-propionamidophenyl)-2-methyl-4,5-dihydro-3(2H)-pyridazinone The active compounds of the present invention have long lasting hypotensive activity which was demonstrated in the following test procedure. Conscious male albino Sherman strain rats averaging approximately 250 grams in weight were fastened to rat boards in a supine position by means of canvas vests and limb ties. The femeral areas were anesthized (subcutaneous infiltration of lidocaine), and the left or right common iliac arteries were exposed and clamped off proximally by an artery clamp and distally with thread. Incisions were made near the tie and short nylon catheters were inserted and tied in place. The other end of the catheters were fitted with 24 gauge hubless needles attached to thick-walled polyethylene tubes. The test compounds were administered to the animals orally by gavage (stomach tube). The test compounds were ordinarily suspended or dissolved in 2 percent aqueous starch solution, one milliliter of which gave, per 100 grams of body weight, the desired dose. Mean arterial blood pressure (M.B.P.) was measured 4 hours after administration of the compounds. Comparisons were then made to the mean control pressure of 123 mm. of mercury which is the average of a number of controls recorded over months of testing. Blood pressure measurements were made with four Statham P23 Db strain gauges (Statham instruments, Los Angeles, Cal.), attached to a Sanborn Polyviso Recorder equipped with four strain gauge preamplifiers with averaging circuits for measuring means arterial pressure. Table I below summarizes the activity of typical active compounds of the present invention.

TABLE I

| Compound | Oral Dose mg./kg. of body weight | No. of rats | M.B.P. mm. Hg |
|---|---|---|---|
| 4,5-dihydro-6-(p-methyl-aminophenyl)-3(2H)--pyridazinone | 100 | 2 | 87 |
| 4,5-dihydro-2-methyl-6-(p--methylaminophenyl)-3(2H)--pyridazinone | 100 | 2 | 106 |
| 6-(p-ethylaminophenyl)--4,5-dihydro-3(2H)--pyridazinone | 100 | 2 | 84 |
| 4,5-dihydro-6-(p-propyl-aminophenyl)-3(2H)--pyridazinone | 100 | 2 | 77 |
| N-methyl-4'-(1,4,5,6-tetra-hydro-6-oxo-3-pyridazinyl)-acetanilide | 100 | 2 | 70 |
| N-ethyl-4'-(1,4,5,6-tetra-hydro-6-oxo-3-pyridazinyl)-acetanilide | 100 | 2 | 68 |

The active compounds of the present invention wherein $R_3$ is hydrogen are organic bases and thus are capable of forming acid-addition salts with a variety of non-toxic organic and inorganic salt-forming reagents. Thus, acid-addition salts, formed by admixture of the organic free bases with an acid, suitably in a neutral solvent, are formed with such acids as sulfuric, phosphoric, hydrochloric, hydrobromic, sulfamic, citric, lactic, malic, succinic, tartaric, acetic benzoic, gluconic, ascorbic, and related acids. For purposes of this invention the free bases are equivalent to their non-toxic acid-addition salts.

The 6-(substituted-phenyl)-4,5-dihydro-3(2H)-pyridazinones of the present invention may be administered either orally or parenterally. The amount of a single dose or of a daily dose to be given will vary but should be such as to give a proportionate dosage of from about one mg. to about 15 mg. per kilogram of body weight per day. Thus, such dosage units are employed that a total of from about 50 mg. to about 1.0 g. for a subject of about 70 kg. body weight are administered in a 24 hour period. This dosage regimen may be adjusted to provide the optimum therapeutic response, for example, several doses of 25–250 mg. may be administered daily or the dose may be proportionately reduced as indicated by the exigencies of the therapeutic siutation.

The 6-(substituted-phenyl)-4,5-dihydro-3-(2H)-pyridazinones may be orally administered, for example, with an inert diluent or with an assimilable edible carrier, or they may be enclosed in hard or soft shell gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, and the like. Such compositions and preparations should contain at least 0.1% of active compound. The percentage in the compositions and preparations may, of course, be varied and may conveniently be between about 5% to about 75% or more of the weight of the unit. The amount of active compound in such therapeutically useful compositions or preparations is such that a suitable dosage will be obtained. Preferred compositions or preparations according to the present invention are prepared so that an oral dosage unit form contains between 25 and 250 milligrams of active compound.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose, or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar, or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

Compositions having the desired clarity, stability, and adaptability for parental use are obtained by dissolving from 0.10% to 10.0% by weight of a 6-(substituted-phenyl)-4,5-dihydro-3(2H)-pyridazinone in a vehicle consisting of a mixture of non-volatile, normally liquid polyethylene glycols which are soluble in both water and organic liquids and which have molecular weights of from about 200 to about 1500. Such mixtures of polyethylene glycols are commercially available and are usually obtained by condensing glycol with ethylene oxide. Although the amount of 6-(substituted-phenyl)-4,5-dihydro-3(2H)-pyridazinone dissolved in the above vehicle may vary from 0.10% to 10.0% by weight, it is preferred that the amount employed be from about 3.0% to about 9.0% by weight. Although various mixtures of the aforementioned nonvolatile polyethylene glycols may be employed, it is preferred to use a mixture of non-volatile polyethylene glycols having an average molecular weight of about 400. Such a mixture is usually referred to as polyethylene glycol 400. A preferred embodiment comprises a clear solution of from about 3.0% to about 9.0% by weight of the 6-(substituted-phenyl)-4,5-dihydro-3(2H)-pyridazinone dissolved in an aqueous solution of polyethylene glycol 400. In addition to the 6-(substituted-phenyl)-4,5-dihydro-3(2H)-pyridazinone, the parenteral solutions may also contain various preservatives which may be used to prevent bacterial and fungal contamination or chemical degradation.

The invention will be described in greater detail in conjunction with the following specific examples.

EXAMPLE 1

Preparation of methyl 3-(p-aminobenzoyl)propionate

A solution of 35.0 g. of 3-(p-acetamidobenzoyl)propionic acid [J.P. English, R.C. Clapp, Q.P. Cole and J. Krapcho, Jr., Amer. Chem. Soc., 67, 2263 (1945)] in 700 ml. of methanol containing 1.4 ml. of sulfuric acid is heated at reflux temperature for 76 hours. The hot solution is added to 7.0 g. of sodium acetate, cooled and filtered to give 21.45 g. of product as crystals, m.p. 164°–167°C.

EXAMPLE 2

Preparation of methyl 3-(p-2,2,2-trifluoroacetamidobenzoyl) propionate

A mixture of 10.98 g. of methyl 3-(p-aminobenzoyl)propionate and 25 ml. of trifluoroacetic anhydride is stirred for 1 hour, then diluted with ice-water with stirring for an additional hour. The mixture is filtered to give 15.29 g. of crystals, m.p. 181°–183°C.

EXAMPLE 3

Preparation of 3-(p-methylaminobenzoyl)propionic acid

To a stirred solution of 7.65 g of methyl 3-(p-2,2,2-trifluoroacetamidobenzoyl)propionate and 6.75 ml. of methyl iodide in 150 ml. of acetone is added 7.10 g. of powdered potassium hydroxide. The mixture is stirred at a reflux temperature for 5 minutes and then the solvent is removed by evaporation. Water is added to the residue and the mixture is heated again at reflux temperature for 10 minutes. The mixture is cooled and washed with methylene chloride. The alkaline solution is stirred in an ice-bath and rendered acidic (pH 4) by the addition of 1N hydrochloric acid. The solid is collected and recrystallized from methanol to give 4.54 g. of pale yellow crystals, m.p. 203°–205°C. dec.

EXAMPLE 4

Preparation of 3-(p-ethylaminobenzoyl)propionic acid

A mixture of 1.53 g. (5.0 mmol) of methyl 3-(p-2,2,2-trifluoroacetamidobenzoyl)propionate and 1.42 g. of powdered potassium hydroxide in 30 ml. of acetone is treated with 1.75 ml. of ethyl iodide and stirred at reflux temperature for 1 hour. The solvent is removed under reduced pressure and the residue is dissolved in 20 ml. of water and this solution is heated on the steam bath for 15 minutes. The cooled mixture is extracted with methylene chloride, and the aqueous solution is chilled in an ice-bath. The pH of the solution is adjusted to 4.0 by addition of 1N hydrochloric acid. The crystalline material is collected by filtration to give 0.43 g. of solid. A sample is recrystallized from acetone-hexane to give white crystals, m.p. 189°–191°C. dec.

EXAMPLE 5

Preparation of 3-[p-(n-propyl)aminobenzoyl]propionic acid

Using the procedure of Example 4, a mixture of 4.53 g. of methyl 3-(p-2,2,2-trifluoroacetamidobenzoyl)propionate and b 4.26 g. of powdered potassium hydroxide in 90 ml. of acetone is treated with 12.1 g. (7.0 ml.) of propyl iodide for 2.5 hours. When the reaction product is isolated as described in Example 4, there is obtained 1.17 g. of brown solid. When it is recrystallized from methanol, tan crystals having m.p. 191°–194°C. dec., result.

EXAMPLE 6

Preparation of 4,5-dihydro-6-(p-methylaminophenyl)-3(2H)-pyridazinone

A solution of 2.00 g. of 3-(p-methylaminobenzoyl)propionic acid and 2 ml. of hydrogen hydrate in 40 ml. of ethyl alcohol is heated at reflux temperature for 2 hours. On cooling, 1.76 g. of white needles, m.p. 222°–224°C., result. A sample recrystallized from ethanol melts at 224°–227°C.

EXAMPLE 7

Preparation of 4,5-dihydro-2-methyl-6-(p-methylaminophenyl)-3(2H)-pyridazinone

A solution of 1.00 g. of 3-(p-methylaminobenzoyl)propionic acid and 2 ml. of methylhydrazine in 35 ml. of ethanol is heated at reflux temperature for 3 hours. The solution is cooled to give 0.71 g. of crystals, m.p. 199°–200°C.

EXAMPLE 8

Preparation of 6-(p-ethylaminophenyl)-4,5-dihydro-3(2H)-pyridazinone

Using the procedure of Example 7, reaction of 1.15 g. of 3-(p-ethylaminobenzoyl)propionic acid with 2 ml. of hydrazine hydrate in 25 ml. of ethyl alcohol gives 0.71 g. of pale yellow crystals, m.p. 213°–216°C.

EXAMPLE 9

Preparation of 6-(p-propylaminophenyl)-4,5-dihydro-3(2H)-pyridazinone

Using the procedure of Example 7, treatment of 320 mg. of 3-[p-(n-propyl)aminobenzoyl]propionic acid with 0.5 ml. of hydrazine hydrate in 10 ml. of ethyl alchol gives 260 mg. of yellow needles, m.p. 182°–183°C.

EXAMPLE 10

Preparation of N-methyl-4'-(1,4,5,6-tetrahydre-6-oxo-3-pyridazinyl)acetanilide

A mixture of 500 mg. of 6-(p-methylaminophenyl)-4,5-dihydro-3(2H)-pyridazinone and 2 ml. of acetic anhydride is stirred for one hour. Ice water is added and stirring is continued for an additional 40 minutes. The product is collected by filtration to give 0.5 g. of white micro-crystals, m.p. 182°–184°C. One recrystallization from acetone-hexane gives white crystals, m.p. 184°–186°C.

EXAMPLE 11

Preparation of N-ethyl-4'-(1,4,5,6-tetrahydro-6-oxo-3-pyridazinyl)acetanilide

Using the procedure of Example 10, 500 mg. of 6-(p-ethylaminophenyl)-4,5-dihydro-3(2H)-pyridazinone is treated with 1 ml. of acetic anhydride to give 0.47 g. of white solid. Recrystallization from acetone-hexane gives white crystals, m.p. 167°–168°C.

EXAMPLE 12

Preparation of Tablet Formulation

| Ingredient | Per Tablet (g.) | For 10,000 Tablets (g.) |
|---|---|---|
| Active ingredient: N-ethyl--4'-(1,4,5,6-tetrahydro-6-oxo--3-pyridazinyl)acetanilide | 0.0500 | 500 |
| Lactose | 0.0800 | 800 |
| Corn Starch (for mix) | 0.0150 | 150 |
| Corn Starch (for paste) | 0.0100 | 100 |
|  | 0.1550 | 1,550 |
| Magnesium Stearate (1%) | 0.0013 | 12.5 |
|  | 0.1563 | 1,562.5 |

The active ingredient, lactose and corn starch (for mix) are blended together. The corn starch (for paste) is suspended in 800 milliliters of water and heated with stirring, to form a paste. This paste is then used to granulate the mixed powders. Additional water is used, if necessary. The wet granules are passed through a No. b 8 hand screen and dried at 120°F. The dry granules are then passed through a No. 16 screen. The mixture is lubricated with 1% magnesium stearate and compressed into tablets in a suitable tableting machine.

EXAMPLE 13

Preparation of Oral Syrup Formulation

| Ingredient | Amount |
|---|---|
| Active ingredient: 4,5-dihydro-2-methyl--6-(p-methylaminophenyl)-3(2H)-pyridazinone | 1000 mg. |
| Sorbitol solution (70% N.F.) | 40 ml. |
| Sodium benzoate | 150 mg. |
| Sucaryl | 90 mg. |
| Saccharin | 10 mg. |
| Red dye (F.D. & C. No. 2) | 10 mg. |
| Cherry flavor | 50 mg. |
| Distilled water, q.s. ad | 100 ml. |

The sorbitol solution is added to 40 ml. of distilled water and the active ingredient is suspended therein. The sucaryl, saccharin, sodium benzoate, flavor and dye are added and dissolved in the above solution. The volume is adjusted to 100 ml. with distilled water.

Other ingredients may replace those listed in the above formulation. For example, a suspending agent such as bentonite magma, tragacanth, carboxymethylcellulose or methylcellulose may be used. Phosphates, citrates or tartrates may be added as buffers. Preservatives may include the parabens, sorbic acid and the like and other flavors and dyes may be used in place of those listed above.

EXAMPLE 14

Preparation of Parenteral Formulation

In a solution of 119 ml. of propylene glycol and 30 ml. of distilled water was dissolved 8.5 g. of 4,5-dihydro-6-(p-methylaminophenyl)-3(2H)-pyridazinone hydrochloride, with stirring. After dissolution was complete, a solution of 850 mg. of sodium formaldehyde sulfoxylate in 3.0 ml of distilled water was then added to the formulation. The pH of this solution was then adjusted to 7.0 with ethanolamine and the volume was made up to 170 ml. with distilled water. The formulation was filtered through a fine sintered glass filter, filled into 5.0 ml. ampoules each containing 2.0 ml., and sealed under nitrogen.

EXAMPLE 15

Preparation of N-methyl-4'-(1,4,5,6-tetrahydro-6-oxo-3-pyridazinyl)formanilide

A mixture of 400 mg. of 6-(p-methylaminophenyl)-4,5-dihydro-3(2H)-pyridazinone, 1 ml. of 97% formic acid and 10 ml. of toluene is stirred at reflux temperature, the water generated by reaction being collected in a Dean-Stark water trap. The solution is evaporated under reduced pressure, and the residue is crystallized from ethanol with the aid of activated carbon to give 240 mg. of white crystals, m.p. 191°–192°C.

EXAMPLE 16

Preparation of N-methyl-4'-(1,4,5,6-tetrahydro-6-oxo-3-pyridazinyl)propionanilide Using the procedure of Example 10 treatment of 430 mg. of 6-(p-methylaminophenyl)-4,5-dihydro-3(2H)-pyridazinone and 2 ml. of propionic anhydride gives 520 mg. of white crystals, m.p. 105°–107°C. Recrystallization of a sample from dilute ethanol gives white crystals, m.p. 108°–110°C.

We claim:

1. A therapeutic composition in dosage unit form useful for lowering blood pressure in mammals comprising from about 50 mg. to about 1.0 gram per daily dosage unit of a compound selected from the group consisting of 4,5-dihydro-6-(p-methylaminophenyl)-3(2H)-pyridazinone and the pharmacologically acceptable acid-addition salts thereof, and a pharmaceutical carrier.

2. A therapeutic composition in dosage unit form useful for lowering blood pressure in mammals comprising from about 50 mg. to about 1.0 gram per daily dosage unit of N-ethyl-4'-(1,4,5,6-tetrahydro-6-oxo-3-pyridazinyl)acetanilide and a pharmaceutical carrier.

3. The method of lowering blood pressure in a mammal which comprises administering internally to said mammal an effective amount of a compound selected from the group consisting of 4,5-dihydro-6-(p-methylaminophenyl)-3(2H)-pyridazinone and the pharmacologically acceptable acid-addition salts thereof, in association with a pharmaceutical carrier to provide a daily dosage of from about one mg. to about 15 mg. per kilogram of body weight of said mammal.

4. The method of lowering blood pressure in a mammal which comprises administering internally to said mammal an effective amount of N-ethyl-4'-(1,4,5,6-tetrahydro-6-oxo-3-pyridazinyl)acetanilide in association with a pharmaceutical carrier to provide a daily dosage of from about one mg. to about 15 mg. per kilogram of body weight of said mammal.

* * * * *